(12) United States Patent
Jacobs et al.

(10) Patent No.: US 8,033,552 B1
(45) Date of Patent: Oct. 11, 2011

(54) UNIVERSAL ATTACHMENT DEVICE FOR SULKIES

(76) Inventors: Sherman L. Jacobs, Broadview Heights, OH (US); Sandra M. Jacobs, Broadview Heights, OH (US)

( * ) Notice: Subject to any disclaimer, the term of this patent is extended or adjusted under 35 U.S.C. 154(b) by 0 days.

(21) Appl. No.: 12/701,102

(22) Filed: Feb. 5, 2010

(51) Int. Cl.
 *B60D 1/14* (2006.01)
(52) U.S. Cl. ......... 280/32.7; 280/492; 280/494; 280/35; 180/15; 180/16
(58) Field of Classification Search .................. 280/32.7, 280/494, 492, 493, 38; 180/15, 16; 58/14.7
See application file for complete search history.

(56) References Cited

U.S. PATENT DOCUMENTS

| | | | |
|---|---|---|---|
| 4,569,187 A | 2/1986 | Spiker et al. | |
| 4,828,282 A | 5/1989 | Pinto | |
| 5,413,364 A | 5/1995 | Hafendorfer | |
| 5,564,721 A * | 10/1996 | Wians | 280/32.7 |
| 5,810,371 A * | 9/1998 | Velke | 280/32.7 |
| D417,676 S | 12/1999 | Havener | |
| 6,062,582 A | 5/2000 | Martin | |
| 6,301,865 B1 | 10/2001 | Velke et al. | |
| 6,890,120 B2 * | 5/2005 | Hozie | 403/58 |

* cited by examiner

Primary Examiner — Tony H. Winner
Assistant Examiner — Jacob Knutson

(57) ABSTRACT

A universal attachment device for attaching lawn care equipment including but not limited to leaf catchers, plug-core aerators, utility carts, and fertilizer spreaders to the sulky of a commercial walk-behind mower, the attachment device features a mounting shaft; a vertical pivot mount disposed on the first end of the mounting shaft for engaging a mounting plate disposed on the sulky; and a vertically oriented mounting channel disposed on the second end of the mounting shaft, the mounting channel functions to a base attachment shaft disposed on the piece of lawn care equipment or the lawn care equipment directly.

6 Claims, 4 Drawing Sheets

UNIVERSAL ATTACHMENT DEVICE FOR SULKIES

FIELD OF THE INVENTION

The present invention is directed to a device for attaching multiple yard-care and related equipment such as a leaf catcher, fertilizer spreader, utility cart and plug-core aerator to a commercial, walk-behind mower outfitted with a one- or two-wheeled sulky.

BACKGROUND OF THE INVENTION

Lawn care customers can and do expect a wide range of services from lawn care providers in addition to lawn mowing. Such services can include but are not limited to fertilizer application, plug-core aeration, leaf and grass clipping removal, and general clean up and removal of twigs, branches, and assorted items at the beginning of each lawn care season. The present invention features a universal attachment device which can allow a single operator with a single mower to utilize a wide variety of tools attached to a standard sulky in order to complete tasks (such as the aforementioned tasks) without the need to purchase specialized equipment for each job.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a universal attachment device for attaching a piece of lawn care equipment to a sulky of a commercial, walk-behind mower. The universal attachment device comprises a mounting shaft having a first end and a second end; a vertical pivot mount disposed on the first end of the mounting shaft for engaging a mounting plate disposed on the sulky, wherein the vertical pivot mount allows pivotal movement of the mounting shaft upwardly and downwardly while restricting lateral movement of the mounting shaft; and a mounting channel disposed on the second end of the mounting shaft, the mounting channel is oriented vertically, the mounting channel functions to engage either (i) a component of the piece of lawn care equipment or (ii) a first end of a base attachment shaft, the base attachment shaft being disposed on the piece of lawn care equipment, wherein the mounting channel allows lateral movement of the piece of lawn care equipment or base attachment shaft while restricting up and down movement of the piece of lawn care equipment or base attachment shaft.

In some embodiments, the piece of lawn care equipment is a leaf catching device, a plug-core aerator, a 2-wheel utility cart, a 4-wheel utility cart, or a fertilizer spreader. In some embodiments, the mounting plate is attached to the sulky via bolts or screws driven through mounting holes disposed in the mounting plate. In some embodiments, the mounting plate is attached near a front end of the sulky. In some embodiments, a grease zerk is disposed on the mounting plate.

In some embodiments, the attachment device further comprises a pivot pin for inserting though apertures in the vertical pivot mount and through apertures in the mounting plate, the pivot pin functioning to secure the vertical pivot mount onto the mounting plate. In some embodiments, the attachment device further comprises a cotter pin for securing the pivot pin in place in the vertical pivot mount and in the mounting plate. In some embodiments, the mounting channel engages a locking shaft disposed on the first end of the base attachment shaft.

The present invention also features a kit comprising a mounting plate for attaching to a sulky; a base attachment shaft having a first end and a second end, the first end of the base attachment shaft is for attaching to a piece of lawn care equipment; and an attachment device for connecting the mounting plate to the base attachment shaft. The attachment device comprises a mounting shaft having a first end and a second end; a vertical pivot mount disposed on the first end of the mounting shaft for engaging the mounting plate disposed on the sulky, wherein the vertical pivot mount allows pivotal movement of the mounting shaft upwardly and downwardly while restricting lateral movement of the mounting shaft; and a mounting channel disposed on the second end of the mounting shaft, the mounting channel is oriented vertically, the mounting channel functions to engage the first end of a base attachment shaft, wherein the mounting channel allows lateral movement of the base attachment shaft while restricting up and down movement of the base attachment shaft.

In some embodiments, the mounting plate comprises mounting holes for allowing the mounting plate to be attached to the sulky via bolts or screws. In some embodiments, the mounting plate comprises a grease zerk. In some embodiments, the kit further comprises a pivot pin for inserting though apertures in the vertical pivot mount and through apertures in the mounting plate, the pivot pin functions to secure the vertical pivot mount onto the mounting plate. In some embodiments, the kit further comprises a cotter pin for securing the pivot pin in place in the vertical pivot mount and in the mounting plate. In some embodiments, the kit further comprises a locking shaft disposed on the first end of the base attachment shaft, the locking shaft functions to engage the mounting channel.

DESCRIPTION OF PREFERRED EMBODIMENTS

Referring to FIGS. 1-5, the present invention features a universal attachment device 100 for attaching one of many yard and lawn care devices (or related equipment) including (but not limited to) a leaf catcher, a fertilizer spreader, a utility cart, and/or a plug-core aerator to a commercial, walk-behind mower 102 outfitted with a one- or two-wheeled sulky 105. For example, in FIG. 5 the attachment device 100 of the present invention is shown attaching a leaf-catching device to the sulky 105, which is shown attached in standard fashion to a commercial walk-behind mower 102. The leaf catching device can help facilitate the collection of both leaves and grass clippings, and is but one of several devices that can be attached via the attachment device in like manner. The device 100 of the present invention is not in any way limited to attaching a leaf catching device.

Figure 5:
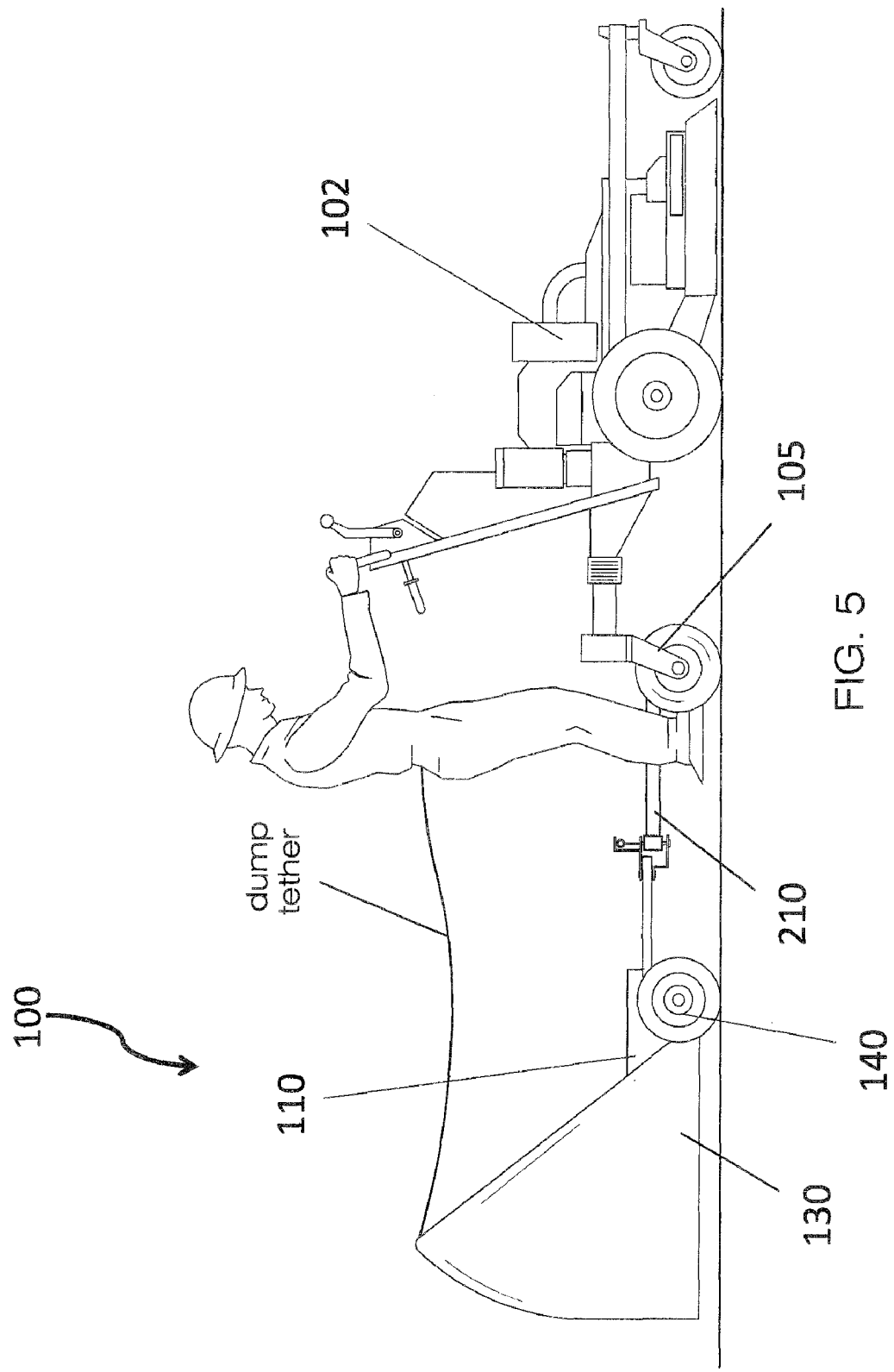
FIG. 5 is an in-use view of the attachment device of the present invention, wherein the attachment device connects a leaf catching device to the sulky (and mower).

Leaf catching devices are well known to one of ordinary skill in the art. FIG. 5 shows a standard leaf catching device comprising a base 110 having a leaf net 130 disposed at the back end of the base 110. The leaf catching device is attached to the sulky 105 (of a mower 102) via the attachment device 100 of the present invention. Disposed on the base 110 of the leaf catching device are wheels 140 for allowing the base 110 to move smoothly behind the mower 102 and sulky 105. The leaf net 130 captures the leaves as the base 110 rolls over them.

In some leaf catching devices, the wheels 140 are connected to an axle that spans the base 110. A plurality of bristles may surround the axle. The bristles function to "sweep" leaves (or other material) that it comes in contact with into the leaf net 130 disposed on the back end of the base 110. As the wheels 140 rotate (when being pulled by the mower 102), the axle rotates and in turn the bristles rotate. The bristles help to lift the leaves into the leaf net 130.

Figure 1:
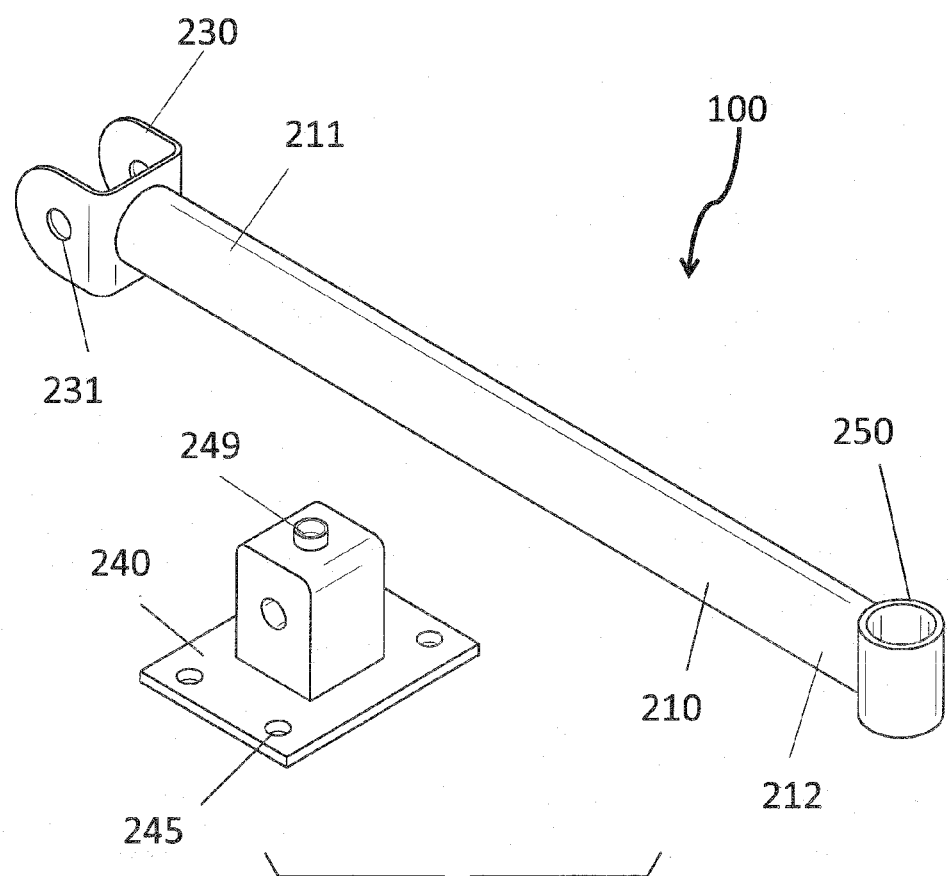
FIG. 1 is a perspective view of the attachment device of the present invention.
Figure 3:
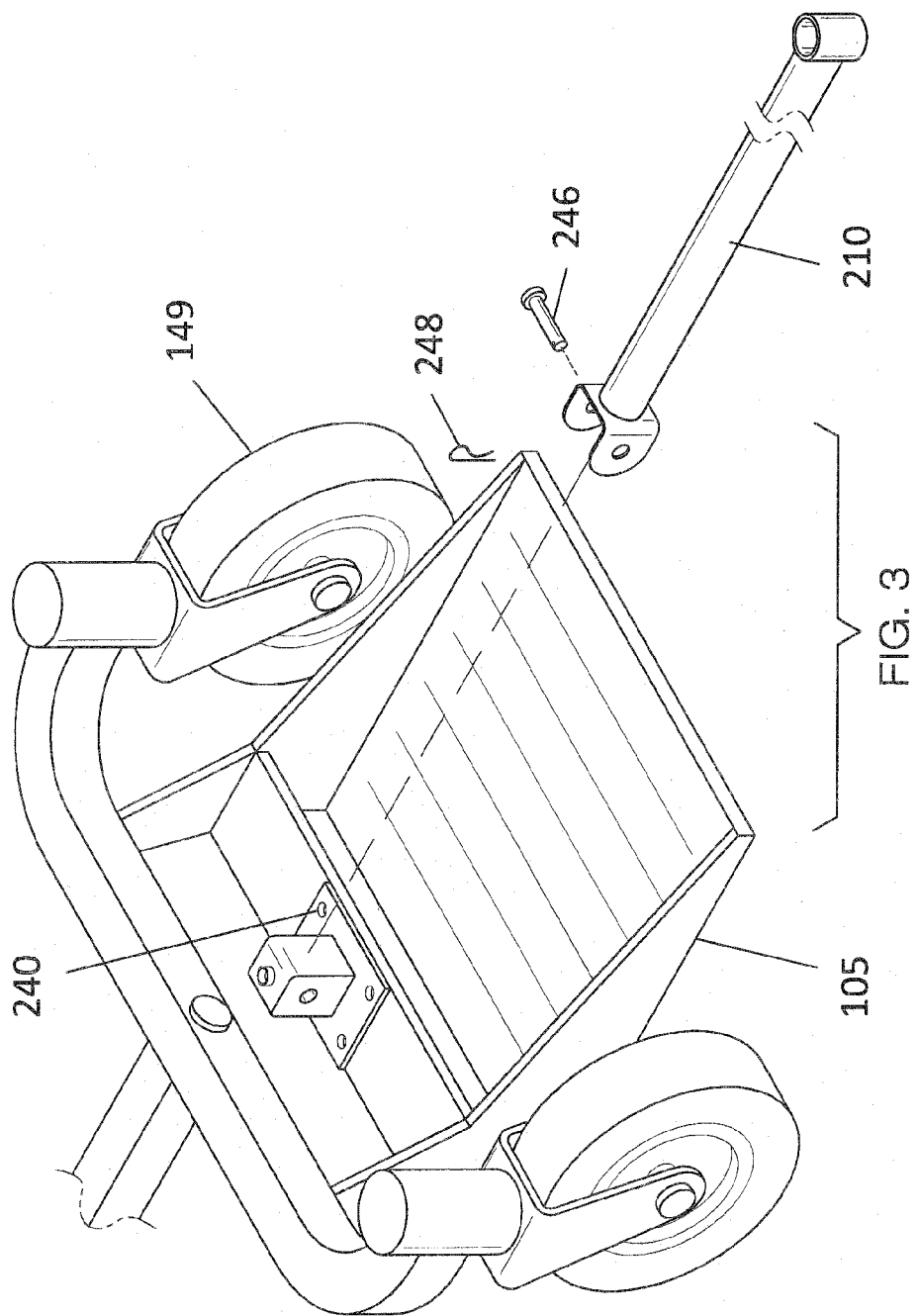
FIG. 3 is an exploded view of the attachment device of FIG. 1, wherein the attachment device is attachable to a sulky.
Figure 4:
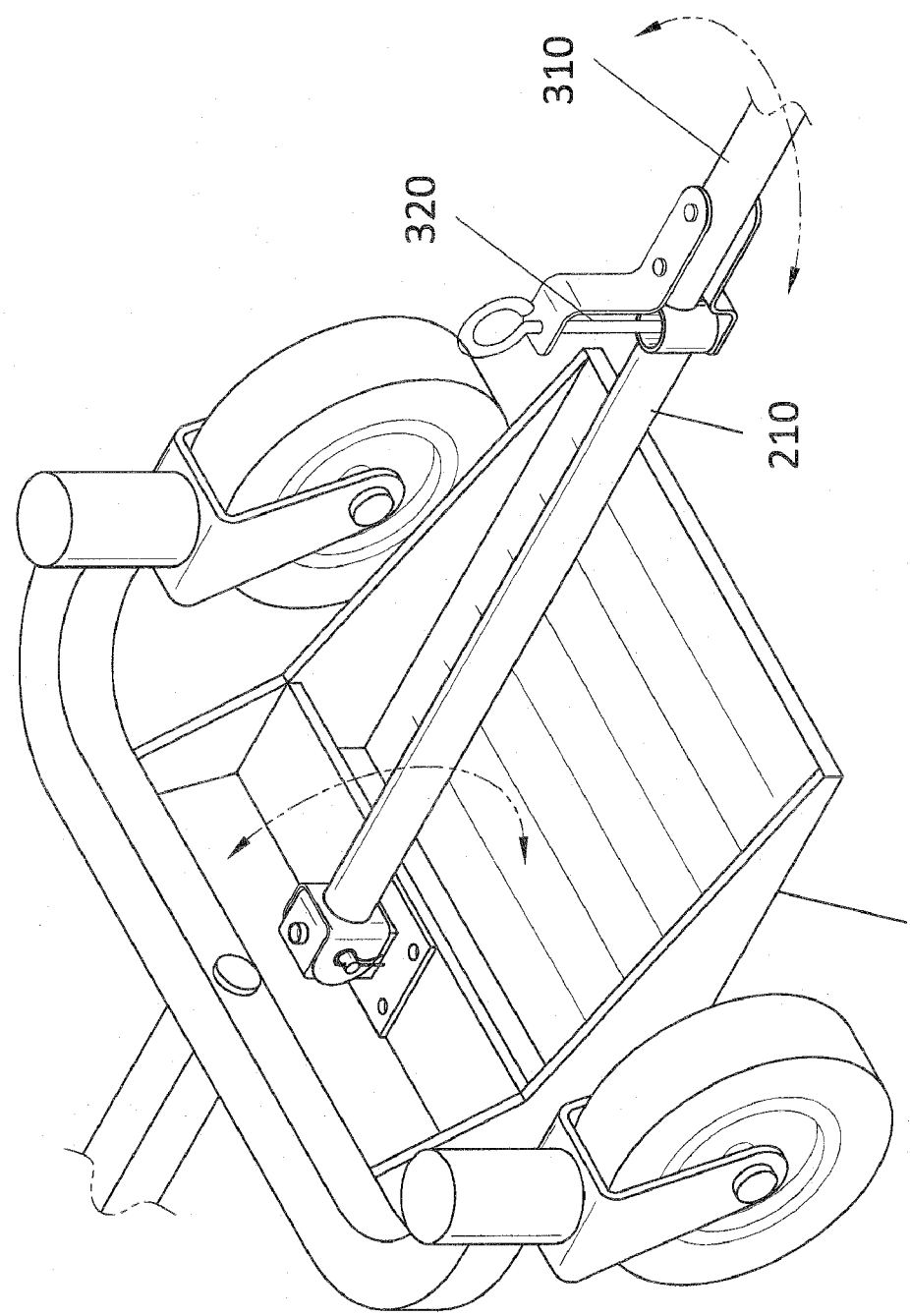
FIG. 4 is a perspective view of the attachment device of FIG. 3 attached to the sulky.

Sulkies are well known to one of ordinary skill in the art. FIG. 3 and FIG. 4 show a standard sulky 105. For example, the sulky 105 has a platform and wheels 149. A mounting plate 240 is disposed at the front end of the sulky 105 (e.g., in front of the foot platform of the sulky 105, see FIG. 3), or a mounting plate 240 can be attached to the sulky 105 if not already in place. FIG. 1 shows the mounting plate 240 of the sulky 105. In some embodiments, the mounting plate 240 can be attached to the sulky 105 via an attachment means, for example bolts, screws, or the like driven through mounting holes 245 disposed in the mounting plate 240. In some embodiments, a grease zerk 249 is disposed on the mounting plate 240 (see FIG. 1, FIG. 2). Grease zerks are well known to one of ordinary skill in the art. For example, grease zerks can be used for adding grease via a grease gun.

The leaf catching device (e.g., the base 110) or other piece of lawn care equipment can be secured to the sulky 105 (e.g., the mounting plate 240 of the sulky 105) via the attachment device 100 of the present invention.

Figure 2:
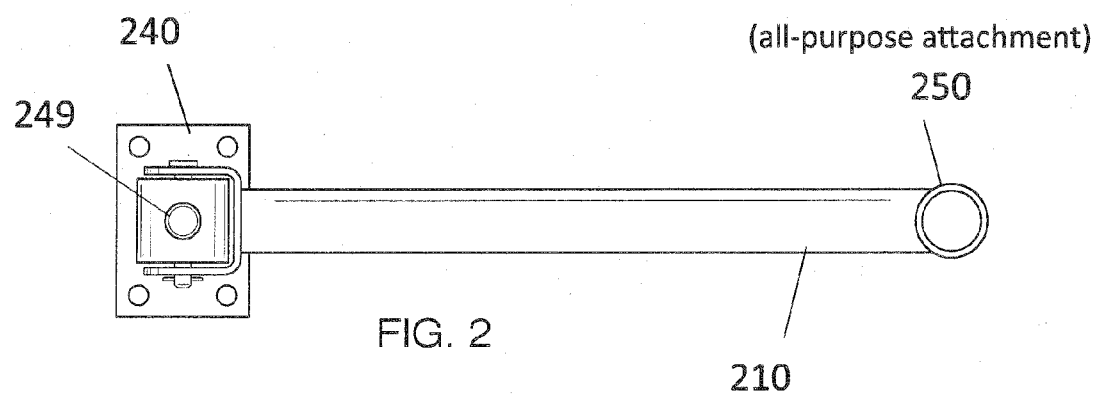
FIG. 2 is a top view of the attachment device of FIG. 1.

As shown in FIG. 1 and FIG. 2, the attachment device 100 of the present invention comprises a mounting shaft 210. The mounting shaft 210 has a first end 211 and a second end 212. The first end 211 of the mounting shaft 210 is for attaching to the mounting plate 240 of the sulky 105 and the second end 212 of the mounting shaft 210 is for attaching to the base 110 of the leaf catching device (or other piece of lawn care equipment). A vertical pivot mount 230 is disposed on the first end 211 of the mounting shaft 210, wherein the vertical pivot mount 230 is for engaging the mounting plate 240 attached to the sulky 105. Vertical pivot mounts are well known to one of ordinary skill in the art. For example, a first pair of apertures 231 is disposed in the vertical pivot mount 230. The vertical pivot mount 230 can be wrapped around the mounting plate 240 such that the first pair 231 of apertures is aligned with a second pair of standard apertures disposed in the mounting plate 240. A pivot pin 246 can be inserted though the apertures of both the vertical pivot mount 230 and the mounting plate 240 to secure the vertical pivot mount 230 onto the mounting plate 240. In some embodiments, a cotter pin 248 may be used to help secure the pivot pin 246 in place (see FIG. 3).

The attachment device 100 (e.g., mounting shaft 210) can pivot upwardly and downwardly with respect to the mounting plate 240. The vertical pivot mount 230 is designed to allow for up and down movement. The vertical pivot mount 230 does not allow for lateral (side-to-side) movement.

A mounting channel 250 is disposed on the second end 212 of the mounting shaft 210. In some embodiments, the mounting channel 250 is oriented vertically, for example the first end of the channel 250 faces upwardly (e.g., toward the sky) and the second end of the channel 250 faces the ground surface. In some embodiments, the vertical orientation of the channel 250 can allow the lawn equipment device (e.g., leaf catching device) to move side-to-side. The mounting channel 250 is for engaging a component of the leaf catching device or other lawn care device. Or, the mounting channel 250 can engage a base attachment shaft 310 disposed on the leaf catching device (e.g., on the base 110).

As previously stated, the attachment device 100 of the present invention is all-purpose attachment device. The present invention is not limited to attaching leaf catchers to the sulky, for example the attachment device 100 (e.g., the mounting channel 250) can accommodate plug-core aerators, 2-wheel and 4-wheel utility carts, fertilizer spreaders, and the like.

In some embodiments a locking shaft 320 is disposed on an end (the end not attached to the lawn care equipment) of the base attachment shaft 310. The locking shaft 320 is for engaging (e.g., inserting through) the mounting channel 250 on the second end 212 of the mounting shaft 210. The locking shaft 320 allows the base attachment shaft 310 to move laterally (side-to-side). The locking shaft 320 does not necessarily allow the base attachment shaft 310 to move up and down.

The attachment device 100 of the present invention may be constructed from a variety of materials and in a variety of sizes. For example, in some embodiments, the attachment device 100 is constructed from a material comprising metal, plastic, wood, rubber, the like, or a combination thereof.

The following the disclosures of the following U.S. Patents are incorporated in their entirety by reference herein: U.S. Pat. No. 6,301,865; U.S. Pat. No. 4,569,187; U.S. Pat. No. 4,828,282; U.S. Pat. No. 5,413,364; U.S. Pat. No. 6,062,582.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A kit comprising:
   (a) a sulky having a front end and a rear end;
   (b) a mounting plate for attaching to the sulky;
   (c) a base attachment shaft having a first end and a second end, the first end of the base attachment shaft is for attaching to a piece of lawn care equipment; and
   (d) an attachment device for connecting the mounting plate to the base attachment shaft, said attachment device comprising:
      (i) a mounting shaft having a first end and a second end;
      (ii) a vertical pivot mount disposed on the first end of the mounting shaft for engaging the mounting plate directly connected on the front end of the sulky, wherein the vertical pivot mount allows pivotal movement of the mounting shaft upwardly and downwardly while restricting lateral movement of the mounting shaft; and (ii) a mounting channel disposed on the second end of the mounting shaft, the mounting channel is oriented vertically, the mounting channel functions to engage the first end of the base attachment shaft, wherein the mounting channel allows lateral movement of the base attachment shaft while restricting up and down movement of the base attachment shaft.

2. The kit of claim 1, wherein the mounting plate comprises mounting holes for allowing the mounting plate to be attached to the sulky via bolts or screws.

3. The kit of claim 1, wherein the mounting plate comprises a grease zerk.

4. The kit of claim 1 further comprising a pivot pin for inserting though apertures in the vertical pivot mount and through apertures in the mounting plate, the pivot pin functions to secure the vertical pivot mount onto the mounting plate.

5. The kit of claim 4 further comprising a cotter pin for securing the pivot pin in place in the vertical pivot mount and in the mounting plate.

6. The kit of claim 1 further comprising a locking shaft disposed on the first end of the base attachment shaft, the locking shaft functions to engage the mounting channel.

* * * * *